(12) United States Patent
Salmon et al.

(10) Patent No.: US 6,550,792 B1
(45) Date of Patent: Apr. 22, 2003

(54) RECYCLING RECEPTACLE

(76) Inventors: Barbara P. Salmon, 9121 SW. 9th Pl., Portland, OR (US) 97219; Steven D. Getz, 9121 SW. 9th Pl., Portland, OR (US) 97219

( * ) Notice: Subject to any disclaimer, the term of this patent is extended or adjusted under 35 U.S.C. 154(b) by 0 days.

(21) Appl. No.: 09/881,960

(22) Filed: Jun. 15, 2001

(51) Int. Cl.[7] ................................................. B62B 1/00
(52) U.S. Cl. .................. 280/47.24; 248/129; 280/47.19
(58) Field of Search ......................... 280/47.131, 47.17, 280/47.19, 47.24, 47.26, 79.2, 79.3; 248/128, 129; D34/24, 25, 26; 108/92; 312/330.1; 211/126.1, 126.2

(56) References Cited

U.S. PATENT DOCUMENTS

| | | | | |
|---|---|---|---|---|
| D116,600 S | * | 9/1939 | Thorn et al. | .......... 211/126.1 X |
| 2,905,480 A | * | 9/1959 | Grovannelli | ............. 280/47.24 |
| 3,010,775 A | * | 11/1961 | Giovannelli | ............. 280/47.24 |
| 5,069,511 A | * | 12/1991 | Swets et al. | ............. 312/107.5 |
| D325,222 S | * | 4/1992 | Brussing | ....................... D19/92 |
| D328,811 S | * | 8/1992 | Streeter | ....................... D34/24 |
| 5,207,344 A | | 5/1993 | Davies et al. | |
| 5,244,220 A | | 9/1993 | Cortez | |
| 5,281,020 A | * | 1/1994 | Romick | ................... 312/330.1 |
| 5,333,885 A | | 8/1994 | Pullman | |
| 5,339,980 A | | 8/1994 | Stutler | |
| 5,458,350 A | | 10/1995 | Johnson et al. | |
| 5,526,539 A | * | 6/1996 | Bower et al. | ................... 4/516 |
| D411,678 S | | 6/1999 | Di Paolo | |
| 6,086,073 A | * | 7/2000 | Tisbo et al. | ............... 280/47.26 |

FOREIGN PATENT DOCUMENTS

WO       91/05720     *   5/1991

* cited by examiner

Primary Examiner—Brian L. Johnson
Assistant Examiner—Bryan Fischmann

(57) ABSTRACT

A recycling receptacle for storing and separating a plurality of items to be recycled. The recycling receptacle includes a platform with a base and a back wall. The base has an upper surface, a lower surface, a front edge, a back edge, a first side edge and a second side edge. The back wall extends upwardly from the back edge. A shelf assembly is attached to the upper surface. An outer wall is attached to and extends upward from the base. The outer wall extends along the second side edge of the base and abuts the back wall. The outer wall is spaced from the shelf assembly.

7 Claims, 4 Drawing Sheets

RECYCLING RECEPTACLE

BACKGROUND OF THE INVENTION

1. Field of the Invention

The present invention relates to recycling storage devices and more particularly pertains to a new recycling receptacle for storing and separating a plurality of items to be recycled.

2. Description of the Prior Art

The use of recycling storage devices is known in the prior art. More specifically, recycling storage devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,244,220; U.S. Pat. No. 5,458,350; U.S. Pat. No. 5,207,344; U.S. Pat. No. 5,339,980; U.S. Pat. No. 5,333,885; U.S. Pat. No. Des. 411,678.

While these devices fulfill their respective, particular objectives and requirements, the aforementioned patents do not disclose a new recycling receptacle. The inventive device includes a platform with a base and a back wall. The base has an upper surface, a lower surface, a front edge, a back edge, a first side edge and a second side edge. The back wall extends upwardly from the back edge. A shelf assembly is attached to the upper surface. An outer wall is attached to and extends upward from the base. The outer wall extends along the second side edge of the base and abuts the back wall. The outer wall is spaced from the shelf assembly.

In these respects, the recycling receptacle according to the present invention substantially departs from the conventional concepts and designs of the prior art, and in so doing provides an apparatus primarily developed for the purpose of storing and separating a plurality of items to be recycled.

SUMMARY OF THE INVENTION

In view of the foregoing disadvantages inherent in the known types of recycling storage devices now present in the prior art, the present invention provides a new recycling receptacle construction wherein the same can be utilized for storing and separating a plurality of items to be recycled.

The general purpose of the present invention, which will be described subsequently in greater detail, is to provide a new recycling receptacle apparatus and method which has many of the advantages of the recycling storage devices mentioned heretofore and many novel features that result in a new recycling receptacle which is not anticipated, rendered obvious, suggested, or even implied by any of the prior art recycling storage devices, either alone or in any combination thereof.

To attain this, the present invention generally comprises a platform with a base and a back wall. The base has an upper surface, a lower surface, a front edge, a back edge, a first side edge and a second side edge. The back wall extends upwardly from the back edge. A shelf assembly is attached to the upper surface. An outer wall is attached to and extends upward from the base. The outer wall extends along the second side edge of the base and abuts the back wall. The outer wall is spaced from the shelf assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new recycling receptacle apparatus and method which has many of the advantages of the recycling storage devices mentioned heretofore and many novel features that result in a new recycling receptacle which is not anticipated, rendered obvious, suggested, or even implied by any of the prior art recycling storage devices, either alone or in any combination thereof.

It is another object of the present invention to provide a new recycling receptacle which may be easily and efficiently manufactured and marketed.

It is a further object of the present invention to provide a new recycling receptacle which is of a durable and reliable construction.

An even further object of the present invention is to provide a new recycling receptacle which is susceptible of a low cost of manufacture with regard to both materials and labor, and which accordingly is then susceptible of low prices of sale to the consuming public, thereby making such recycling receptacle economically available to the buying public.

Still yet another object of the present invention is to provide a new recycling receptacle which provides in the apparatuses and methods of the prior art some of the advantages thereof, while simultaneously overcoming some of the disadvantages normally associated therewith.

Still another object of the present invention is to provide a new recycling receptacle for storing and separating a plurality of items to be recycled.

Yet another object of the present invention is to provide a new recycling receptacle which includes a platform with a base and a back wall. The base has an upper surface, a lower surface, a front edge, a back edge, a first side edge and a second side edge. The back wall extends upwardly from the back edge. A shelf assembly is attached to the upper surface. An outer wall is attached to and extends upward from the base. The outer wall extends along the second side edge of the base and abuts the back wall. The outer wall is spaced from the shelf assembly.

Still yet another object of the present invention is to provide a new recycling receptacle that contains multiple storage areas adapted for holding various items in an easily accessible manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
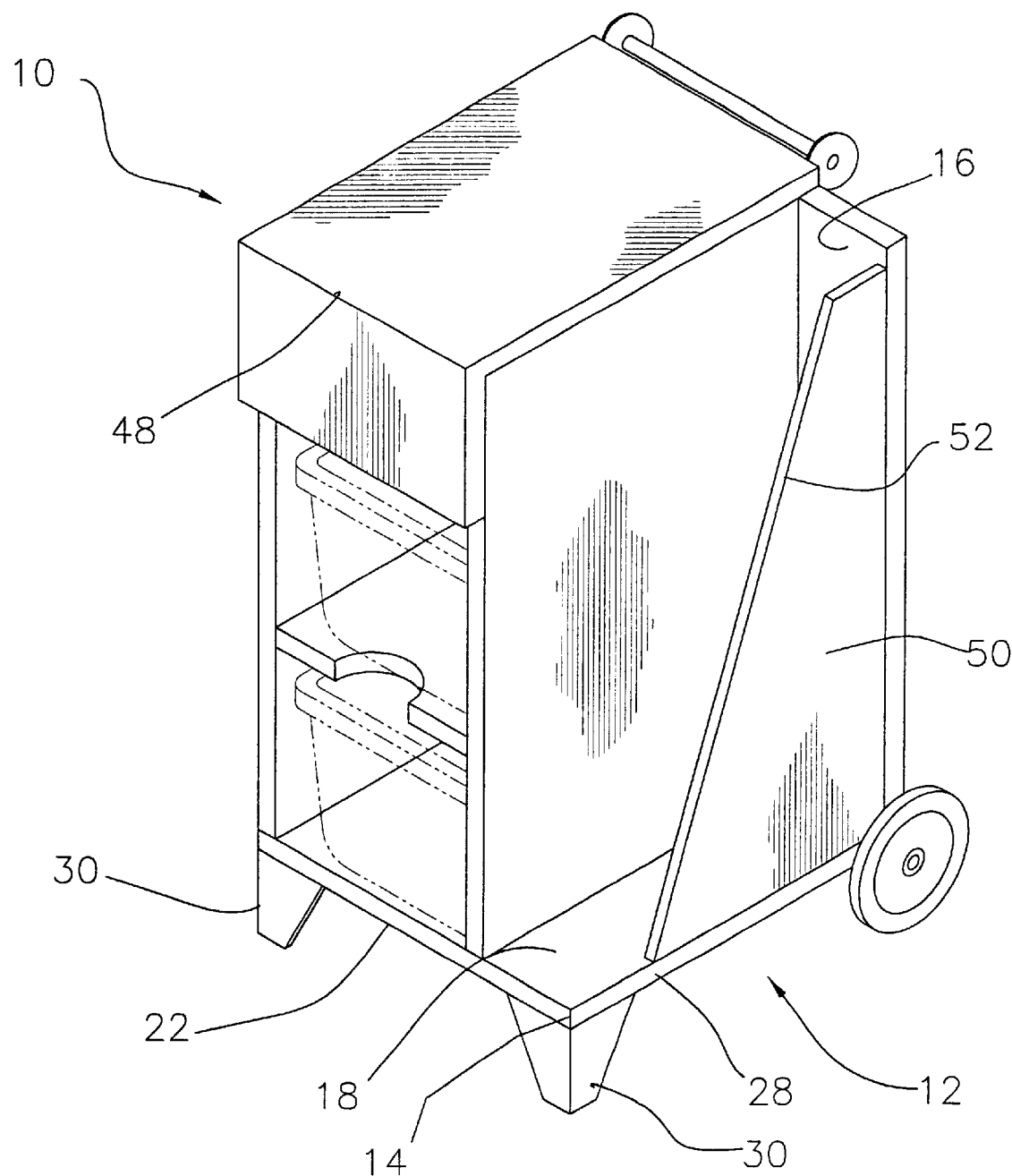
FIG. 1 is a schematic perspective view of a new recycling receptacle according to the present invention.
Figure 2:
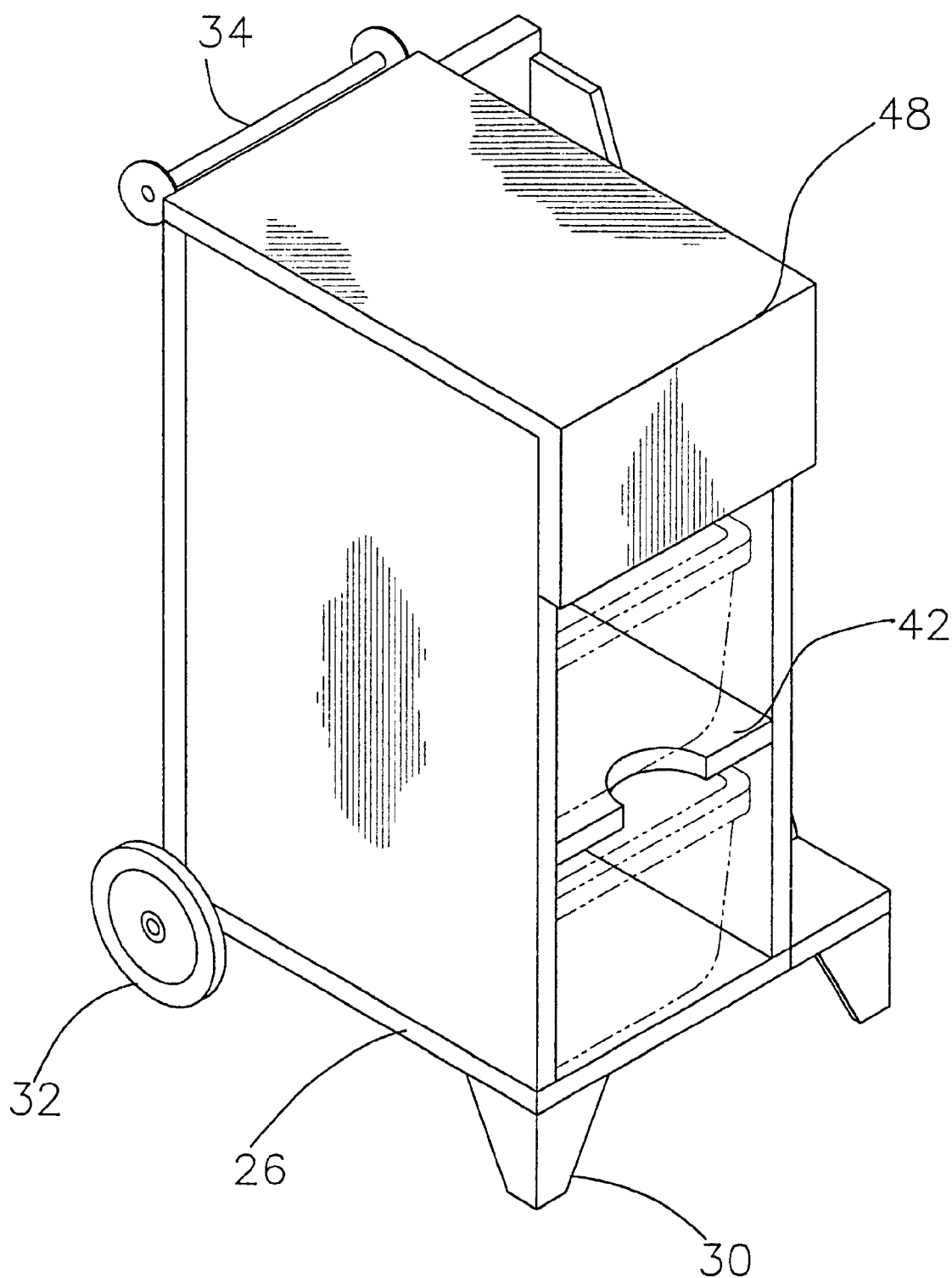
FIG. 2 is a schematic perspective view of the present invention.
Figure 3:
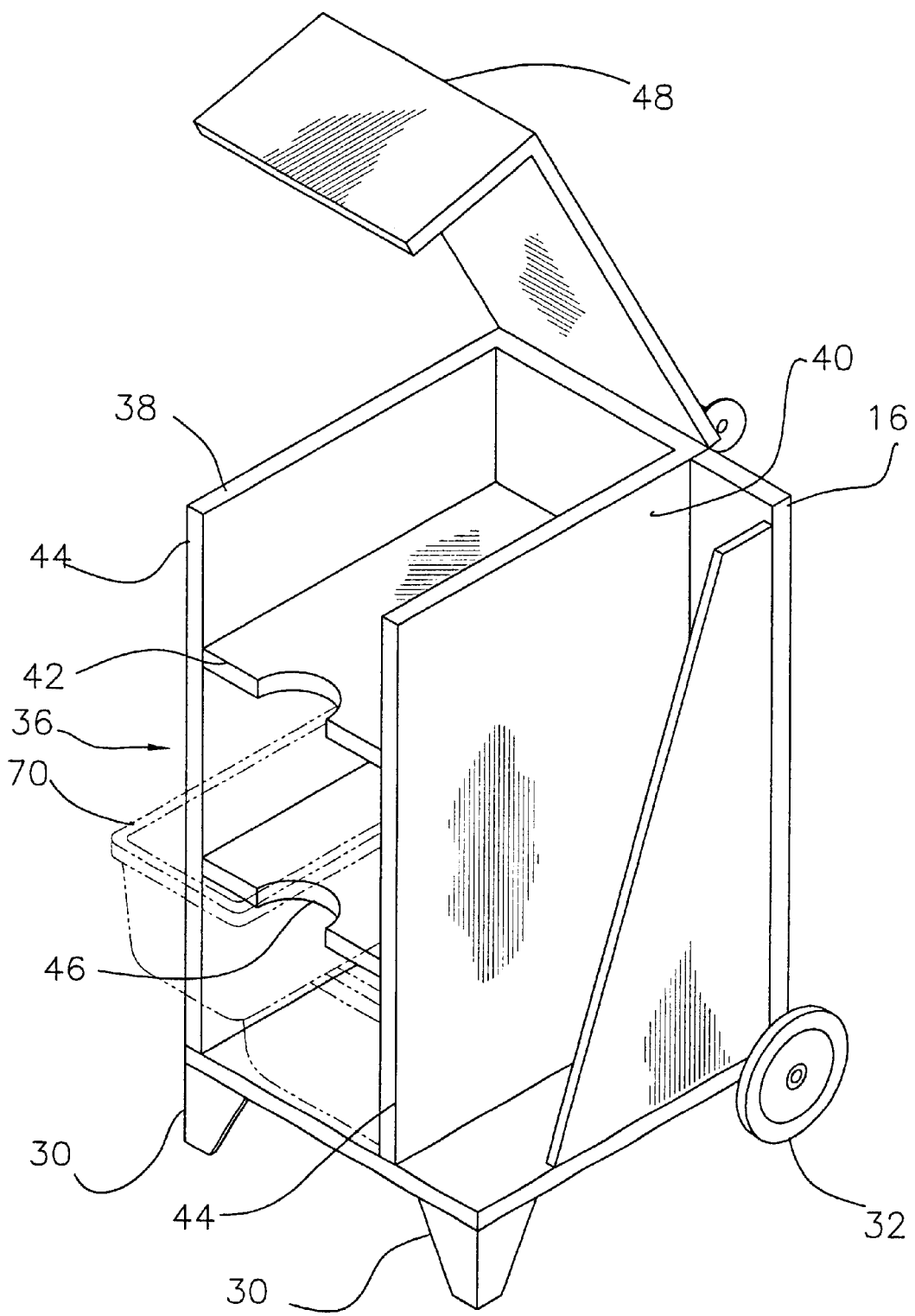
FIG. 3 is a schematic perspective view of the present invention.
Figure 4:
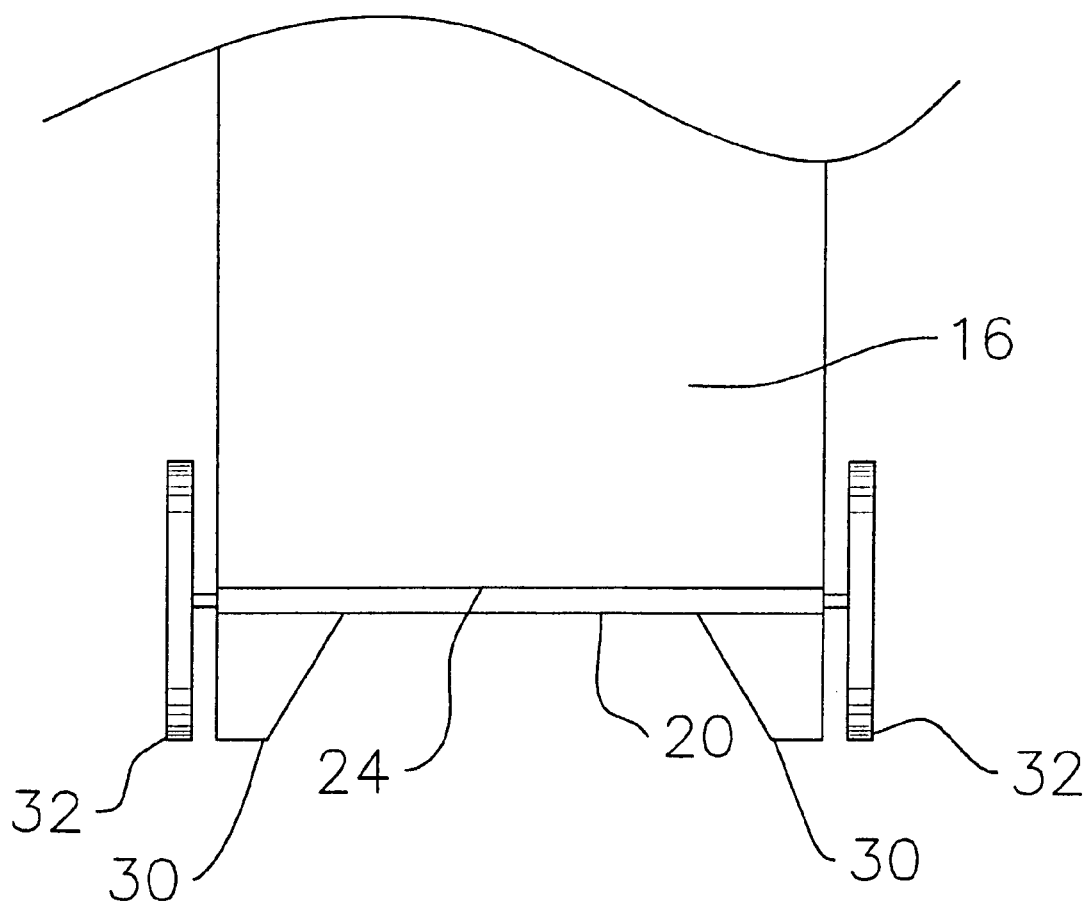
FIG. 4 is a schematic back view of the present invention.

With reference now to the drawings, and in particular to FIGS. 1 through 4 thereof, a new recycling receptacle embodying the principles and concepts of the present invention and generally designated by the reference numeral 10 will be described.

As best illustrated in FIGS. 1 through 4, the recycling receptacle 10 generally comprises a platform 12 including a base 14 and a back wall 16. The base 14 has an upper surface 18, a lower surface 20, a front edge 22, a back edge 24, a first side edge 26 and a second side edge 28. The back wall 16 extends upwardly from the back edge 24. Each of a pair of legs 30 is attached to the lower surface 20 and positioned generally adjacent to the front edge 22. The legs 30 are spaced from each other. Each of a pair of wheels 32 is rotatably coupled to one of the side edges 26, 28. The wheels 32 are positioned generally adjacent to the back edge 24. A handle 34 is attached to the back wall 16.

A shelf assembly 36 is attached to the upper surface 18. The shelf assembly 36 includes a pair of side walls 38, 40 attached to the upper surface 18 of the base 14 and orientated generally parallel to each other. A first of the side walls 38 extends along the first side edge 26. A second of the side walls 40 is spaced from the second side edge 28. Each of the side walls 38, 40 extends from the back wall 16 to the front edge 22 of the base 16 and has a height equal to the back wall 16.

Each of a plurality of panels 42 extends between and each is attached to the side walls 38, 40. Each of the panels 42 extends between the back wall 16 and front edges 44 of the side walls 38, 40. The panels 42 each have a front edge 44 having an arcuate depression 46 therein. The plurality of panels 42 is preferably two panels.

A cover 48 is hingedly coupled to a top edge of the back wall 16 and is positionable over the shelf assembly 36. The cover 48 extends downward to an uppermost one of the panels 42.

An outer wall 50 is attached to and extends upward from the base 14. The outer wall 50 extends along the second side edge 28 of the base 14 and abuts the back wall 16. The outer wall 50 is spaced from the shelf assembly 36. Preferably the outer wall 50 has a front edge 52 angled downward from the back wall 16 to the base 14.

In use, each of the panels 42 may be used for holding containers 70 for storing items such as cans or plastic items for recycling. The arcuate depressions 46 aids removing the containers 70 from the shelf assembly 36. Newspaper or other paper products for recycling may be positioned between the outer wall 50 and the shelf assembly 36.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A portable recycling container and sorting device comprising:

a platform including a base and a back wall, said base having an upper surface, a lower surface, a front edge, a back edge, a first side edge and a second side edge, said back wall extending upwardly from said back edge;

a shelf assembly being attached to said upper surface;

an outer wall being attached to and extending upward from said base, said outer wall extending along said second side edge of said base and abutting said back wall, said outer wall being spaced from said shelf assembly;

a pair of legs being attached to said lower surface and positioned generally adjacent to said front edge, said legs being spaced from each other, each of a pair of wheels being rotatably coupled to one of said side edges, each of said wheels being positioned generally adjacent to said back edge;

wherein said shelf assembly comprises:

a pair of side walls being attached to said upper surface of said platform and being orientated generally parallel to each other, a first of said side walls extending along said first side edge, a second of said side walls being spaced from said second side edge;

a plurality of panels extending between and attached to said side walls, each of said panels extending between said back wall and front edges of said side walls; and a cover being hingedly coupled to a top edge of said back wall and being positionable over said shelf assembly, said cover extending downward to an uppermost one of said panels.

2. The portable recycling container and sorting device as in claim 1, further including a handle being attached to said back wall.

3. A portable recycling container and sorting device comprising:

a platform including a base and a back wall, said base having an upper surface, a lower surface, a front edge, a back edge, a first side edge and a second side edge, said back wall extending upwardly from said back edge;

a shelf assembly being attached to said upper surface; and an outer wall being attached to and extending upward from said base, said outer wall extending along said second side edge of said base and abutting said back wall, said outer wall being spaced from said shelf assembly;

wherein said shelf assembly comprises:

a pair of side walls being attached to said upper surface of said platform and being orientated generally parallel to each other, a first of said side walls extending along said first side edge, a second of said side walls being spaced from said second side edge;

a plurality of panels extending between and attached to said side walls, each of said panels extending between said back wall and front edges of said side walls; and a cover being hingedly coupled to a top edge of said back wall and being positionable over said shelf assembly, said cover extending downward to an uppermost one of said panels.

4. The portable recycling container and sorting device as in claim 3, wherein each of said panels has a front edge having an arcuate depression therein.

5. The portable recycling container and sorting device as in claim 3, wherein said plurality of panels is two panels.

6. The portable recycling container and sorting device as in claim 3, wherein each of said side walls extending from said back wall to said front edge of said base and having a height equal to said back wall.

7. A portable recycling container and sorting device comprising:

a platform including a base and a back wall, said base having an upper surface, a lower surface, a front edge, a back edge, a first side edge and a second side edge, said back wall extending upwardly from said back edge, a pair of legs being attached to said lower surface and positioned generally adjacent to said front edge, said legs being spaced from each other, each of a pair of wheels being rotatably coupled to one of said side edges, each of said wheels being positioned generally adjacent to said back edge, a handle being attached to said back wall;

a shelf assembly being attached to said upper surface, said shelf assembly comprising;

a pair of side walls being attached to said upper surface of said platform and being orientated generally parallel to each other, a first of said side walls extending along said first side edge, a second of said side walls being spaced from said second side edge, each of said side walls extending from said back wall to said front edge of said base and having a height equal to said back wall;

a plurality of panels extending between and attached to said side walls, each of said panels extending between said back wall and front edges of said side walls, each of said panels having a front edge having an arcuate depression therein, said plurality of panels being two panels;

a cover being hingedly coupled to a top edge of said back wall and being positionable over said shelf assembly, said cover extending downward to an uppermost one of said panels; and an outer wall being attached to and extending upward from said base, said outer wall extending along said second side edge of said base and abutting said back wall, said outer wall being spaced from said shelf assembly, the outer wall having a front edge being angled downward from the back wall to the base.

* * * * *